(12) United States Patent
Hollis

(10) Patent No.: US 9,577,854 B1
(45) Date of Patent: Feb. 21, 2017

(54) APPARATUSES AND METHODS FOR ASYMMETRIC BI-DIRECTIONAL SIGNALING INCORPORATING MULTI-LEVEL ENCODING

(71) Applicant: Micron Technology, Inc., Boise, ID (US)

(72) Inventor: Timothy Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/831,517

(22) Filed: Aug. 20, 2015

(51) Int. Cl.
*H04L 25/49* (2006.01)
*H04L 27/04* (2006.01)
*H04L 27/06* (2006.01)
*G06F 1/32* (2006.01)

(52) U.S. Cl.
CPC ........... *H04L 25/4917* (2013.01); *G06F 1/324* (2013.01); *H04L 27/04* (2013.01); *H04L 27/06* (2013.01)

(58) Field of Classification Search
CPC .............. H04L 25/4917; H04L 425/925; G06F 2213/13036
USPC .................................. 375/286, 257; 709/212
See application file for complete search history.

(56) References Cited

U.S. PATENT DOCUMENTS

| 8,291,139 | B2 | 10/2012 | Hollis | |
|---|---|---|---|---|
| 2005/0135489 | A1* | 6/2005 | Ho | H04L 5/20 375/257 |
| 2009/0225873 | A1* | 9/2009 | Lee | H04L 25/49 375/257 |
| 2014/0177645 | A1* | 6/2014 | Cronie | H04L 1/0041 370/441 |
| 2015/0180994 | A1* | 6/2015 | Hollis | G06F 13/4273 709/212 |

* cited by examiner

*Primary Examiner* — Khai Tran
(74) *Attorney, Agent, or Firm* — Dorsey & Whitney LLP

(57) ABSTRACT

Apparatuses and methods for asymmetric bi-directional signaling incorporating multi-level encoding are disclosed. An example apparatus may include first and second channels, a receiver coupled to the first and second channels, and first and second transmitters coupled to the first and second channels, respectively. The receiver may be configured to receive differential data signals to receive write data at a rate, and each of the first and second transmitters may be configured to encode a plurality of bits into a respective data signal and provide the respective data signals at the data rate.

24 Claims, 4 Drawing Sheets

APPARATUSES AND METHODS FOR ASYMMETRIC BI-DIRECTIONAL SIGNALING INCORPORATING MULTI-LEVEL ENCODING

BACKGROUND

Many electronics systems include multiple devices communicating with one another via a connection, such as conductive traces on a printed circuit board on which the devices are mounted or conductive traces connecting different areas of an integrated circuit on a single die. While the various devices included in an electronics system may be internally operating at different speeds, the communications that occur between the devices may be operating based on a system clock. This system clock may determine input/output (I/O) speeds of the host system and may also be limited by the slowest device in the system. For some devices, a logic device for example, a fast system clock may pose no problems because the internal components of the device, e.g., transistors, may operate based on a higher clock rate than the system clock. For other devices, however, a system clock that begins to reach their maximum internal operating speeds begins to pose problems for I/O operations and/or general functionality.

The differences between the internal operating speeds of the various devices of the electronics system may be influenced by their respective fabrication processes. For example, a logic fabrication process used to fabricate logic devices (e.g., systems on a chip, processors, controllers, etc.) may be optimized for operating speed. The logic fabrication process optimized for operating speeds may thus produce transistors and circuits that are capable of performing at high clock rates. The fabrication process therefore provides fast transistors that may display fast switching times. The transistors may also be more sensitive to input voltage changes and may further be able to distinguish between a larger variety of input voltages. Accordingly, devices built using logic fabrication processes may be able to provide data at high data rates and be able to distinguish between different inputs at varying voltage levels.

Other devices, on the other hand, may have comparatively slower transistors, which may result in comparatively slower internal operating rates and I/O rates. Memories, for example, may be fabricated using a memory fabrication process that is optimized for data retention, not transistor speed. Consequently, the transistors built on a memory fabrication process may require larger voltages for enabling/disabling transistors and may drive signals at comparatively slower data rates, for example. As such, the input circuits may require input signals of larger voltage swings compared to logic devices so that the inputs are reliably detected. Further, the output circuits may drive large voltage swing signals at comparatively slow rates. As a consequence, a maximum I/O rate the output circuits are capable of reaching may be limited due to the transistor capabilities.

At higher I/O rates, a memory output circuit may not be able to drive signals accordingly or meet desired data transfer rates. As such, a device receiving outputs from the memory, e.g., a memory controller or a system on a chip, may not receive reliable signals at those higher I/O rates.

DETAILED DESCRIPTION

Figure 1:
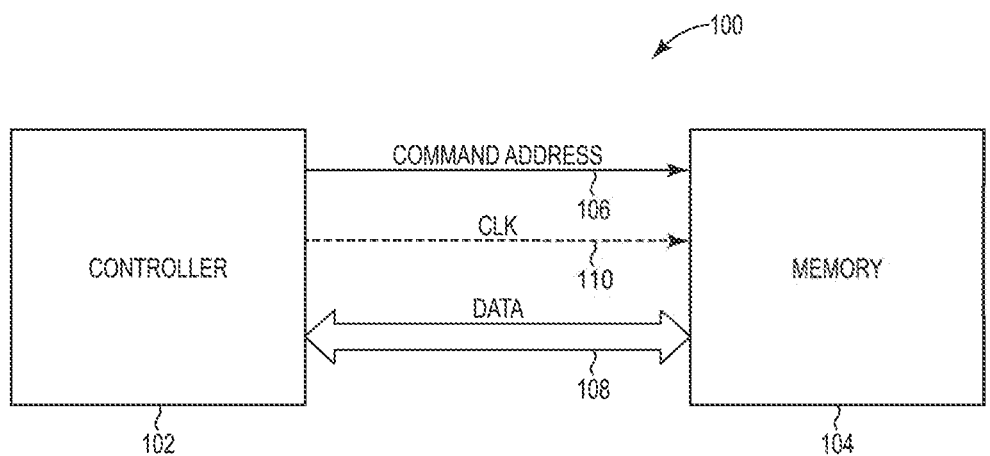
FIG. 1 is a block diagram of an apparatus according to an embodiment of the present disclosure.

Apparatuses and methods for asymmetric, bi-directional signaling incorporating multi-bit encoding are disclosed herein. Certain details are set forth below to provide a sufficient understanding of embodiments of the disclosure. However, it will be clear to one having skill in the art that embodiments of the disclosure may be practiced without these particular details. Moreover, the particular embodiments of the present disclosure described herein are provided by way of example and should not be used to limit the scope of the disclosure to these particular embodiments. In other instances, well-known circuits, control signals, timing protocols, and software operations have not been shown in detail in order to avoid unnecessarily obscuring the disclosure.

As discussed above, various devices (e.g., integrated circuits such as logic devices, memory controllers, systems on a chip, processors, memories, etc.) of an electronic system may perform at varying rates, such as internal operation rates, which may be based on internal clock rates, and data rates (the rate at which the device may be able to receive and/or provide data externally), which may be different. As used herein, clock rate may be used to refer to a clock rate at which the devices may operate, and data rate may be used to refer to a rate at which data is provided, e.g., transmitted, by a device. Additionally, devices may operate based on different clock rates. For example, an I/O process may be based on a different clock rate than other internal processes. However, the various clock rates clocking operation may all be based on a system clock. The clock rate may be given in units of gigahertz (GHz), while the data rate may be given in units of gigabits per second (Gb/s). While the data rate and the clock rate may be distinguished from one another, the data rate may be derived from a clock rate used for clocking data transmission. For example, a clock rate of 2.5 GHz may correspond to a data rate of 5.0 Gb/s for systems having a two times difference between clock rate and data rate. Other systems may have a different factor between clock and data rates, which are also contemplated by the present disclosure. These various operating clock rates may limit the highest operating rate at which the electronic system may operate. The internal clock rates at which the slowest device may operate may also affect the rate at which data may be transferred (e.g., transmitted, provided, sent, etc.) by that device, which may be due to the clock rate determining how fast data may be transferred. The variation in clock rates, for example, may be a byproduct of associated fabrication processes. For example, a memory controller or system on a chip may be fabricated with a logic fabrication process, while a memory may be fabricated on a memory fabrication process.

A memory controller, for example, which may be one possible interface between memory and other devices of an electronic system, such as a processor, may be fabricated using a logic fabrication process. In some embodiments, the other devices may interact directly with the memory without the memory controller, and are further capable of implementing the asymmetric, bi-directional signaling incorporating multi-bit encoding of the present disclosure. Further, while memory applications are expected to benefit from the present invention, the composite performance of any interface limited by asymmetric component-level performance at either end may be maximized through application of the present disclosure. As previously discussed, the logic fabrication process, which may be optimized for fast operating rates, may produce transistors that may be characterized as fast so that they operate at higher operating rates, e.g., can switch at fast rates. The transistors may also be more sensitive so that they may be able to resolve voltages of relatively close values. In this light, transmitters (e.g., transistors) of the memory controller may be able to drive data signals at fast data rates, and receivers of the memory controller may be able to receive and reliably detect signals having respective voltage levels that are relatively close. Accordingly, the controller may have flexibility with respect to operating at various transmission and receipt parameters, such as reference levels, transmit/receive rates, etc.

In contrast, as also previously discussed, a memory, whether volatile or nonvolatile, may be fabricated using a fabrication process that is optimized for data retention, which may not produce transistors that are as fast or as sensitive as transistors fabricated by a logic fabrication process. As such, I/O circuits of the memory, e.g., transmitters and receivers, may not be able to reliably provide signals at fast clock rates, which may limit their maximum achievable data rate for standard or differential data transmission. As used herein, "differential data transmission," may refer to transmission of true and complementary data signals. This limitation may be due to the limited switching rates of the transistors included in the transmitter, which may limit the data rates memory fabrication-based transmitters may be able to achieve. While some design considerations may produce drivers that provide relatively faster switching rates, the memory-focused fabrication process may limit the switching rate the transmitters are able to provide. The limited switching rate may be acceptable at low clock rates, 2.0 GHz for example, but may cause problems at higher clock rates, 3.0 GHz and above for example. Accordingly, the limited switching rate may limit the clock rate, which may in turn limit the data rate.

While a memory controller may be able to provide data to a memory at a faster data rate, 10 Gb/s for example, a memory may not be able to match the same data rate in response. Such a scenario may be undesirable due to the asymmetric data rates, which may affect system bandwidth. In some embodiments of the present disclosure, symmetric data rates may be provided by using multi-bit encoding on the memory side of the transmission, while using differential data transmission on the controller side of the transmission. The multi-bit encoding may allow multiple bits to be transmitted in a single transmission at a slower clock rate, which may allow the memory to operate at a slower clock rate while still providing symmetric data rates.

The asymmetric, bi-directional signaling incorporating multi-bit encoding of the present disclosure may be discussed with reference to a memory and a memory controller. The discussion of the memory controller however, is used for ease of discussion and is not limiting. The asymmetric, bi-directional signaling incorporating multi-bit encoding may also occur between a memory and any other type of device capable of direct interaction with a memory or between any combinations of devices whose intercommunication is limited by the independent performance of at least one side of the intercommunication link.

FIG. 1 is a block diagram of an apparatus 100 (e.g., an electronic device, a smartphone, a computing device, a wearable electronic device, etc.) according to an embodiment of the present disclosure. The apparatus 100 may include a controller 102 (e.g., memory controller or a system on a chip) and a memory 104. The controller 102 and the memory 104 may be coupled to each other by a command and address bus 106, and a data bus 108, which may be bi-directional. In some examples, the memory 104 may be a volatile memory, such as a synchronous double data rate random access memory (SDDRAM), synchronous DRAM, DDRAM, etc., and in other examples, the memory 104 may be a nonvolatile memory, such as NAND flash. NOR flash, phase change memory, etc. The memory 104 may be configured to store information and perform memory operations, e.g., writes and reads, responsive to memory commands. In response to write commands, the controller may provide data to the memory 104 using differential data transmission, e.g., transmitting a true value and a complementary value for each bit. The data transmission from the controller, however, is not liming. For example, in some embodiments, the controller may provide data using binary, single-ended data signaling. Conversely, in response to read commands, the memory 104 may provide data to the controller 102 using multi-bit encoding. The encoding may be used to encode multiple bits into a single data signal where a voltage level of the transmission during the data period is indicative of the corresponding bit values encoded into the single transmission. As used herein, data signal may mean a single instance of data transmission based on a rising or falling edge of a clock signal. Additionally, data signals comprising the encoded bits may also be referred to as symbols. For example, with regards to differential signaling, a single data signal may be the transmission/receipt of a bit of data at a true value and its complement at a rising or falling edge of the CLK 110, while a data period for single-ended signaling may be the transmission/receipt of one instance of data at a rising or falling edge of the CLK 110. For DDR-DRAM, a single data signal may occur on both the rising and falling edges of the CLK 110.

The data bus 108 may include a plurality of channels for data to be transferred (e.g., provided, driven, transmitted, etc.) between the controller 102 and the memory 104. Each of the plurality of channels may be used to provide data signals, which may be differential data or data signals that include a plurality of bits encoded into a single transmission. Since both the controller 102 and the memory 104 may transmit and receive data, each channel may include both a transmitter and a receiver, such that a channel may be coupled to corresponding transmitters and corresponding receivers included in the controller 102 and the memory 104. Each transmitter and receiver may operate in accordance with a clock signal, such as provided by clock 110, or a derivative of the clock signal. In another example, the plurality of conduction channels of the data bus 108 may be associated in pairs so that data is transferred using differential signal transmission, such that for each data bit a true value and a complementary value are transferred between the devices. In another example, the plurality of channels of the data bus 108 may be used in a standard transmission scheme, e.g., single-ended transmission, such that only true data values are transferred. For example, using single-ended transmission, n bits of data may be simultaneously transmitted over n channels, whereas in the differential scheme, n/2 bits may be simultaneously transmitted over the n channels. A third example may include serially transmitting data over the data bus 108, which may reduce the number of channels, but both devices may require serializers and deserializers for this example.

The controller 102 may provide memory commands and corresponding addresses via the command and address (C/A) bus 106. The C/A bus 106 may be a common bus or it may be two separate busses, e.g., a command bus and an address bus. Commands and addresses may be provided by the controller 102 either synchronously or asynchronously. Data may be provided between the controller 102 and the memory 104 via the data bus 108, with the data also being provided either synchronously or asynchronously. The controller 102 may also provide a clock signal to the memory 104 separately from the data and the commands/addresses as indicated by the dashed line 110. Alternatively, the controller 102 may not provide a clock signal to the memory 104 separately, but instead may embed a clock signal in the data signals. For example, in some embodiments, the clock signal may be derived by the memory 104 from data signals provided on the data bus 108 through known clock recovery techniques. The clock signal may be used to determine timing of operations performed by the memory 104. For example, the controller 102 may transmit a read command to the memory 104 and expect the data to be present on the data bus 108 at a certain number of clock cycles of the clock signal later. The clock signal may then be used by the memory to determine when to provide the data on the data bus 108 as expected.

Between the devices of the apparatus 100, the controller 102 and the memory 104 for example, a desired data transfer rate may be determined by the lowest maximum operating frequency of the included devices. If the lowest maximum operating frequency is limiting the data transfer rate, however, asymmetric data signaling may be adopted to meet higher data rates and to further provide symmetric data rates even at higher data rates. Asymmetric data signaling may include receiving data by differential signal transmission and providing encoded data in a single-ended format. For example, if the controller 102 is able to operate at a data rate of 10 Gb/s using differential signal transmission, then the memory 104 may use multi-bit encoding combined with single-ended signaling to meet the 10 Gb/s data rate even though the memory 104 may be operating at a slower clock rate. An example multi-bit encoding technique may be multi-level pulse amplitude modulation (PAM), which uses a plurality of voltage levels to indicate logic states of a plurality of bits. The memory 104 may use one of the plurality of voltage levels to indicate a combination of the encoded bits, where each of the plurality of voltage levels may be an analog voltage level between two supply voltages, for example. The controller 102 may compare a received encoded data signal to a reference voltage level to determine the logic states of each of the encoded bits. For example, if four-level PAM is implemented, then two bits of data may be encoded into one of four voltage levels. For example, a "10," which may be a combination of a bit at a high logic state, e.g., a "1," and a bit at a low logic state, e.g., a "0," may be encoded into a voltage level of two-thirds of a supply value, e.g., ⅔Vcc. The encoded value may then be transmitted during a single data period using one signal. In some embodiments, the multi-bit encoding may be implemented with multi-phase encoding and/or multi-level encoding. Accordingly, transmitting two bits in this manner may allow for the memory 104 to operate at a clock rate of 2.5 GHz providing a data rate of 2×5 Gb/s, which may correspond to 10 Gb/s data rate since each data period of a signal may represent two bits. Further, because the memory 102 signals independently over two wires, its internal clock rate may be reduced by an additional factor of two while maintaining the desired data rate. Accordingly, in some embodiments, there may be a factor of four clock rate difference between the controller 102 and the memory 104.

In operation, the memory 104 may receive a write command and a memory address on the C/A bus 106 along with the data to be stored at that memory address, which may be provided on the data bus 108. The data provided by the controller 102 may be provided using a differential signal transmission, for example. In some embodiments, the differential data signals may be encoded to include multiple bits, while in other embodiments the differential data signals may be un-encoded, e.g., not encoded. The controller 102 may be transmitting the write data at 10 Gb/s, for example. Read commands received by the memory 104 may be accompanied by a memory address. In response to the read command, the memory 104 may provide the requested data to the controller 102 via the data bus 108. The data provided by the memory 104 may be provided using single-ended transmission. The data provided by the memory 104 may be encoded with multiple bits using a multi-bit encoding scheme, four-level PAM for example.

The memory 104 may receive the commands, addresses, and data from the memory controller and perform memory operations in response. For example, when a write command is received, the memory 104 may store data received over the data bus 108 at a received memory array address. As noted, the data may be received by a differential signal transmission. In response to read commands, the memory 104 may provide data to the memory controller 102 via the data bus 108. Similarly to above, the memory 104 may provide encoded data to the memory controller 102. The encoded data may represent a plurality of bits encoded into a single data signal. For example, the memory 104 may encode two bits of data into a corresponding voltage level, which may be indicative of the logic states of the two bits. The encoded voltage level may then be transmitted to the controller 102. As mentioned above, an example encoding method may be four-PAM, which may result in two bits being encoded into one of four voltage levels corresponding to a combination of logic levels for the two bits. For example, "00" may be encoded into a data transmission signal of zero volts, a "01" may be encoded into a signal of ⅓ VDD, where VDD may be a supply voltage. The other two possible bit combinations, "10" and "11," may be, for example, encoded into signals associated with voltage levels of ⅔ VDD and VDD, respectively. While the voltage levels are disclosed as having a uniform separation based on VDD, the separation may not be uniform in some embodiments. In some embodiments, the voltage levels that designate the different bit combinations may be based off of a current and not a voltage, where the current may be determined by receiver and transmitter drive current combinations. The examples provided are for illustrative purposes and are a non-limiting aspect of the present disclosure. In general, any multi-level and/or multi-phase encoding technique may be used to encode a plurality of bits into a single signal for a data period.

The number of bits encoded and the number of potential voltage levels may be related. For example, two bits may be encoded into four voltage levels, three bits into 8 voltage levels, and so on. Additionally, the number of bits encoded into the signal may also affect the data rate and the clock rate used to encode the bits and/or provide the signal. To continue with the four-PAM example, an encoder circuit used to encode the two bits into one of the four voltage levels may be operating at one-fourth a system clock rate, whereas a driver providing the signal of the encoded data may be operating at one-half the system clock. For example, if the system clock is 5 GHz, an encoder circuit may operate at 1.25 GHz and the driver circuit may operate at 1.25 GHz. For this example, transmitting two bits encoded into a signal at 1.25 GHz may provide a data rate per channel of 5 Gb/s, which may provide an effective data rate of 10 Gb/s, e.g., 2×5 Gb/s, for a pair of channels when the data rate of the pair of channels is summed. A pair of channels may correspond to two channels used for differential data transmission. Accordingly, the bandwidth in both directions between the controller 102 and the memory 104 may be symmetric with a controller providing data at a data rate of 10 Gb/s.

Figure 2:
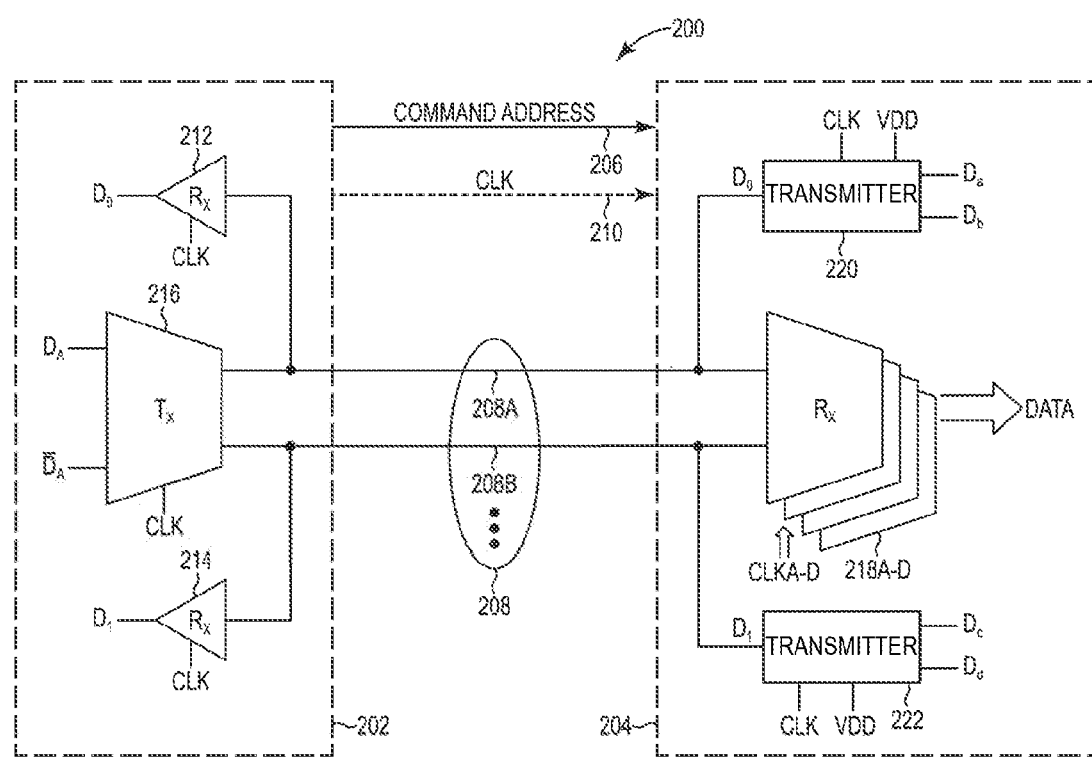
FIG. 2 is a block diagram of an apparatus according to an embodiment of the present disclosure.

FIG. 2 is a block diagram of an apparatus 200 according to an embodiment of the present disclosure. The apparatus 200 may include a controller 202 and a memory 204. The apparatus 200 may be an example of the apparatus 100 of FIG. 1. The memory 204 may receive commands and addresses from the controller 202 via a CMD/ADDR (C/A) bus 206. The controller 202 may also provide a clock signal 210. Data may be transferred between the controller 202 and the memory 204 over the data bus 208. The data bus 208 may include a plurality of channels 208A-N where N represents any non-zero whole number, not all of which are shown in FIG. 2. The data provided by the controller 202 may be provided by differential signal transmission such that the N channels are used to provide N/2 bits per transmission. In response to read commands, the memory 204 may encode bits of data using multi-bit encoding and transmit a signal indicative of the encoded bits using single-ended signaling.

The data bus 208 may be bi-directional and used for either conventional data transmission, e.g., single ended transmission, or differential data transmission, e.g., pairs of channels for true and complementary data bits. The N channels of the bus 208 may carry N signals during single-ended transmissions and may carry N/2 bits during differential signal transmissions. As discussed, the controller 202 may transmit data by differential signal transmission such that $D_A$ and $/D_A$ are transmitted over channels 208A and 208B, respectively, where $D_A$ is a true value and $/D_A$ is a complementary value. The memory 204, on the other hand, may transmit data using single-ended transmissions such that each channel provides a data signal. For example, $D_0$ may be transmitted over 208A while $D_1$ may be transmitted over 208B. Accordingly, the apparatus 200 may implement asymmetric data transfer. The asymmetry of the data transfer may further be distinguished by the memory 204 encoding multiple bits into a single data transmission.

The controller 202 may include a receiver for each channel of the data bus 208 and further include a transmitter for each pair of channels of the data bus 208. For example, the controller 202 may include receiver 212 associated with channel 208A and receiver 214 associated with channel 208B. Further, the controller 202 may include transmitter 216 associated with channels 208A and 208B. The transmitter 216 may be configured to transmit differential data $D_A$ and $/D_A$ over channels 208A and 208B, respectively. The receiver 212 may receive a data signal over channel 208A, while the receiver 214 may receive a different data signal over channel 208B. While the transmitter 216 is depicted as a single transmitter, in some embodiments, the transmitter 216 may be divided into two transmitters.

The memory 204 may include a transmitter associated with each channel of the data bus 208 and a plurality of fractional-rate receivers associated with each pair of channels of the data bus 208. For example, transmitter 220 may be coupled to channel 208A, and transmitter 222 may be coupled to channel 208B. Further, a plurality of fractional-rate receivers may be coupled to channels 208A, B. Each of the plurality of fractional-rate receivers may receive a respective clock signal, where each respective clock signal is a derivative of the system clock. Further, the clock rate of each of the respective clock signals may be dependent upon the number of fractional-rate receivers associated with each pair of channels 208A-N. For example, four fractional-rate receivers 218A-D receiving respective clock signal CLKA-D may be coupled to channels 208A, B of the data bus 208. The clock rate of each of the four clock signals CLKA-D may be one-quarter the system clock rate and they may further be out of phase with one another by one-quarter of a clock period, for example. Four fractional-rate receivers are shown in FIG. 2 for illustrative purposes only and the number of fractional-rate receivers is a non-limiting aspect of the present disclosure. Fewer or more fractional-rate receivers may be used in other embodiments.

The transmitters 220 and 222 may be configured to receive a plurality of bits, encode the received bits into one of a plurality of voltage levels based on the logic levels of the bits, and transmit a signal corresponding to the encoded reference voltage level. For example, two bits of data may be encoded into one of four voltage levels based on the logic levels of the two bits. As such, the resulting voltage level may be indicative of the logic level of the two bits. For example, the bit combination of "00" may be encoded into a low voltage value, zero volts for example, the bit combination of "11" may be encoded into a high voltage value, a supply voltage VDD for example. Bit combinations of "01" and "10" may be encoded into voltage values between zero and VDD, such as one-third VDD and two-thirds VDD, respectively. The transmitters 220, 222 may then provide a data signal to a respective channel of the data bus 208 at a respective voltage level.

In operation of a write command, the controller may provide, e.g., transmit, differential data across the data bus 208 to the memory 204. For differential data transmission, the transmitter 216 may receive data $D_A$ and $/D_A$, and in response, transmit, e.g., drive, the $D_A$ and $/D_A$ data signals onto the channels 208A, B of the data bus 208, respectively. In response to receiving the data signals $D_A$ and $/D_A$ during a first data period, the fractional-rate receiver 218A may capture, e.g., resolve, the complementary data signals, which are data signals that are complementary to each other, and provide the data to internal components of the memory 204. The data signals may be captured by the fractional-rate receiver 218A based on a rising or falling edge of the clock signal CLKA. If a subsequent data transmission follows data signals $D_A$ and $/D_A$, e.g., a subsequent data period, then the fractional-rate receiver 218B may capture the subsequent data transmission based on the clock signal CLKB. Subsequent data transmissions may be captured by the fractional-rate receivers 218C and 218D in sequence before returning back to 218A. In some embodiments, the DATA provided by the fractional-rate receivers 218A-D may only consist of the true data value. In other embodiments, the fractional-rate receivers 218A-D may provide both the true and complementary bit values.

In operation of a read command, the memory 204 may encode a plurality of bits into a single data signal and transmit the encoded signal during a clock cycle, where the single data signal may be transmitted at one of a plurality of voltage levels. For double data rate memories, two data signals may be transmitted per clock cycle with each data signal including a plurality of encoded bits. Each of the plurality of voltage levels may correspond to a different combination of bit logic levels as discussed above. For example, the transmitter 220 may receive bits $D_a$ and $D_b$, encode the two bits into a corresponding voltage level, and provide data $D_0$ at that voltage level. The voltage level may be indicative of the bits $D_a$ and $D_b$. To state another way, the data $D_0$ may be based on the logic levels of the bits $D_a$ and $D_b$, where based on the logic level may also mean based on the combination of the logic levels. Further, $D_0$ may be at one of four voltage levels, where each voltage level corresponds to, e.g., indicates, the respective logic levels of the bits $D_a$ and $D_b$. For example, if $D_a$ is a "0" and $D_b$ is a "1," the encoded data $D_0$ may be equal to one-third VDD, which may be one of four reference levels. The other three voltage levels may be zero, two-third VDD, and VDD. The specific derivatives of VDD for providing each of the plurality of voltage levels is disclosed as just one example, and is a non-limiting aspect of the present disclosure.

The transmitter 222, which receives bits $D_c$ and $D_d$, may be configured similarly to encode a plurality of bits into a single data signal and transmit the encoded signal during a data period, where a data period may be one-half a clock cycle for double data rate embodiments. For example, the transmitter may encode the bits $D_c$ and $D_d$ into a corresponding voltage level to be transmitted as data $D_1$ over the channel 208B. Encoding the bits $D_c$ and $D_d$ into data $D_1$ may, for example, be based on four-PAM encoding. In some embodiments, the transmitters 220 and 222 may operate in concert to provide respective data signals $D_0$ and $D_1$ in unison.

Accordingly, while the controller 202 and the memory 204 transmit data signals based on different clock rates, their effective data rates may equal. For example, if the controller 202 transmits data at 10 Gb/s, then the memory 104 may transmit data signals at 5 Gb/s over each channel, but since each data signal may include two bits, for example, the effective data rate of the memory is 10 Gb/s for a pair of channels when their respective data rates are summed. The data rate of 5 Gb/s per channel may be clocked by a clock rate of 1.25 GHz, for example. As such, the data rates may be matched while the signaling methods, e.g., differential and single-ended, between the controller 202 and the memory 204 may be asymmetrical. Further, the fractional-rate receivers 218A-D may also be operating at a slower clock rate than the system clock. Accordingly, the asymmetric, bi-directional signaling may allow the memory to operate internally at a lower clock rate then the controller 202, for example.

Figure 3:
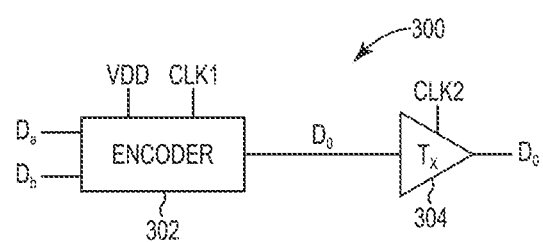
FIG. 3 is a block diagram of a transmitter according to an embodiment of the present disclosure.

FIG. 3 is block diagram of a transmitter 300 according to an embodiment of the present disclosure. The transmitter 300 may include an encoder 202 and an output driver 304. The transmitter 300 may receive a plurality of bits, two for example, and encode the plurality of bits into a data signal at a corresponding voltage level, which may then be provided, e.g., transmitted, by a driver circuit. The data signal may be encoded to one of a plurality of voltage levels based on the logic levels of each of the plurality of data bits.

In some embodiments, the number of bits encoded into a data signal may be two, as shown in FIG. 3. The encoder 302 may receive two bits $D_a$ and $D_b$, and encode the two bits into a data signal at one of four voltage levels. The resulting voltage level may be based on the combination of the logic states of bits $D_a$ and $D_b$. In some embodiments, the four voltage levels may be based on the supply voltages of the transmitter 300. For example, if one supply voltage is ground and a second supply voltage is VDD, then the four voltage levels may be ground, e.g., zero, one-third VCC, two-thirds VDD, and VDD, which would provide four equally spaced voltage levels. The value of the voltage levels, however, is a non-limiting aspect of the present disclosure, and may also be based on current levels of the transmitter, for example. The encoder 302 may also receive a clock signal $CLK_1$, which may be the same as a system clock (not shown) or a derivative of the system clock. The rate of the $CLK_1$ signal may further be based on a target data rate of the transmitter 300.

The driver 304 may be a standard driver known in the art and may operate responsive to the clock signal $CLK_2$. In some embodiments, the $CLK_2$ signal may be the same as the system clock (not shown) and/or the same as $CLK_1$. For example, the rate of $CLK_1$ and $CLK_2$ may be 1.25 GHz. In some embodiments, $CLK_1$ and $CLK_2$ may be different. The driver 304 may be coupled to the encoder 302 and configured to provide, e.g., drive, the data signal D0 onto a data bus, for example. While the encoder 302 and the driver 304 are shown as separate components in FIG. 3, in some embodiments the encoder 302 and the driver 304 may be combined.

In operation, the encoder 302 may receive two bits $D_a$ and $D_b$ responsive to $CLK_1$. The encoder 302 may then encode the two bits into a data signal at one of four voltage values based on the combination of their logic states. The encoder 302 may then provide the data signal $D_0$ to the driver 304. The driver 304 may then provide the signal $D_0$ onto a data bus (not shown), such as a channel of the data bus 208 of FIG. 2 for example. The driver 304 may then provide data signal Do responsive to $CLK_2$ signal. The $CLK_2$ signal may have a clock rate of 1.25 GHz, which may correspond to a data rate of 5 Gb/s, per channel for example. However, since each data signal provided by transmitter 300 may include two bits, the effective data rate may be 5 Gb/s, e.g., 2×5 Gb/s, per channel. The data rate and clock rate values disclosed are for illustrative purposes only and are a non-limiting aspect of the present disclosure.

Figure 4:
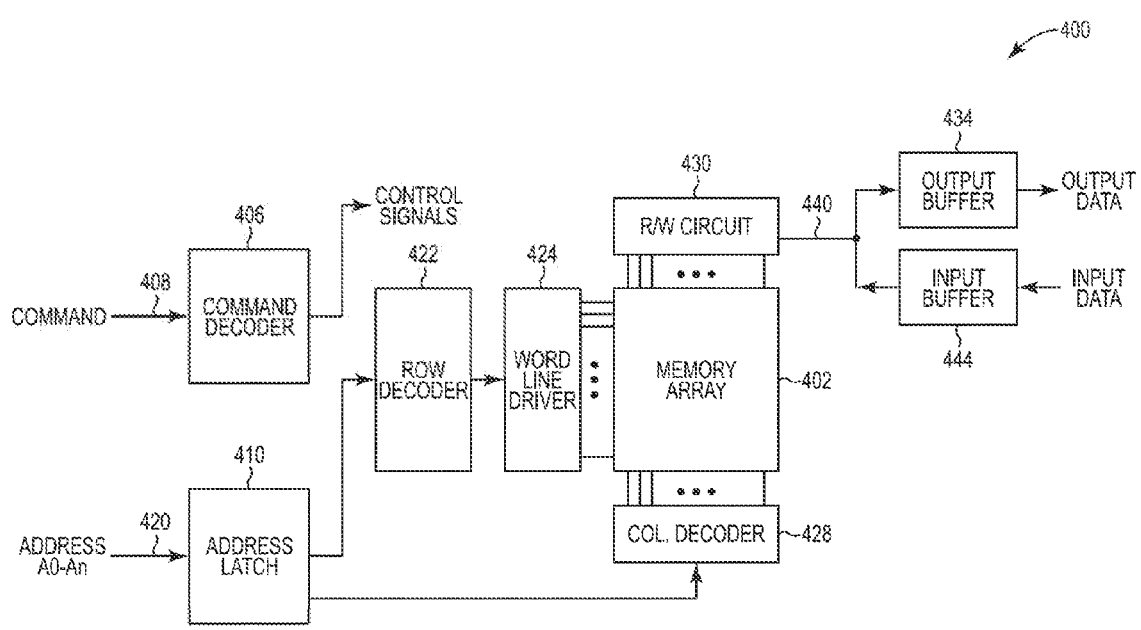
FIG. 4 is a memory according to an embodiment of the present disclosure.

FIG. 4 illustrates a memory 400 according to an embodiment of the present disclosure. The memory 400 includes an array 402 of memory cells, which may be, for example, volatile memory cells (e.g., DRAM memory cells, SRAM memory cells), non-volatile memory cells (e.g., flash memory cells), or some other types of memory cells. The memory system 400 includes a command decoder 406 that receives memory commands through a command bus 408 and generates corresponding control signals within the memory system 400 to carry out various memory operations. The command decoder 406 responds to memory commands applied to the command bus 408 to perform various operations on the memory array 402. For example, the command decoder 406 is used to generate internal control signals to read data from and write data to the memory array 402. Row and column address signals are applied to the memory system 400 through an address bus 420 and provided to an address latch 410. The address latch then outputs a separate column address and a separate row address.

The row and column addresses are provided by the address latch 410 to a row address decoder 422 and a column address decoder 428, respectively. The column address decoder 428 selects bit lines extending through the array 402 corresponding to respective column addresses. The row address decoder 422 is connected to word line driver 424 that activates respective rows of memory cells in the array 402 corresponding to received row addresses. The selected data line (e.g., a bit line or bit lines) corresponding to a received column address are coupled to a read/write circuitry 430 to provide read data to a data output buffer 434 via an input-output data bus 440. Write data are applied to the memory array 402 through a data input buffer 444 and the memory array read/write circuitry 430.

The input data buffer 444 may receive data from a memory controller, for example, for storing in the array 402 in response to a write command, for example. The input data buffer 444 may include a receiver or a plurality of fractional-rate receivers, such as the fractional-rate receivers 218A-D of FIG. 2, and are configured to receive differential data signals. The received data may be received over a bi-directional data bus (not shown) that couples the memory 400 to the memory controller.

The output buffer 434 may provide data stored in the array 402 to the memory controller in response to a read command, for example. The output data buffer 434 may include a transmitter, such as the transmitter, which may encoder a plurality of bits into a data signal. The transmitter may include an encoder and a signal driver, for example, such as the encoder 302 and driver 304 of FIG. 3 or the transmitter 220/222 of FIG. 2. The encoded signals may represent a plurality of bits based on a voltage level of the encoded signal. The data may be provided over the bi-directional bus (not shown) that couples the memory 400 to the memory controller.

While differential signaling may have been primarily discussed with regards to the examples and embodiments disclosed herein, the signaling scheme used by a controller, such as the controller 102 of FIG. 1, is a non-limiting aspect. In other embodiments, the controller may transmit data using single-ended transmissions, with or without multi-level encoding. Further, a controller may combine multi-level encoding with differential signal transmission. Additionally, a memory may combine multi-level encoding with differential transmission.

Memories in accordance with embodiments of the present invention may be used in any of a variety of electronic devices including, but not limited to, computing systems, electronic storage systems, cameras, phones, wireless devices, displays, chip sets, set top boxes, or gaming systems.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. An apparatus, comprising:
   first and second channels;
   a receiver coupled to the first and second channels and configured to receive differential data signals to receive first data at a first data rate; and
   first and second transmitters coupled to the first and second channels, respectively, each transmitter configured to encode a plurality of bits into a respective data signal and provide the respective data signals at a second data rate, wherein a summation of the respective data signal at the second data rate equals the first data rate,
   wherein each transmitter encodes the plurality of bits based on a pulse amplitude modulation encoding method.

2. The apparatus of claim 1, wherein each of the first and second transmitters comprises:
   an encoder configured to encode the plurality of bits into the data signal; and
   a driver coupled to the encoder and configured to receive the data signal and provide the data signal.

3. The apparatus of claim 1, wherein the differential data signals are received from a controller and wherein the data signals are provided to the controller.

4. The apparatus of claim 1, wherein the transmitter encodes the plurality of bits into one of a plurality of voltage levels.

5. The apparatus of claim 4, wherein the plurality of bits is two bits and wherein the plurality of voltage levels is four voltage levels.

6. The apparatus of claim 1, wherein the pulse amplitude modulation encoding method is a four-level pulse amplitude modulation encoding method.

7. The apparatus of claim 1, wherein the first data rate is twice the second data rate.

8. An apparatus, comprising:
   a receiver configured to receive un-encoded differential data signals;
   first and second encoders configured to encode a respective plurality of bits into a respective encoded data signal, wherein the data signal is provided at one of a plurality of voltage levels, and wherein the one of the plurality of voltage levels is indicative of a bit combination of the plurality of bits; and
   first and second drivers coupled to the first and second encoders, respectively, and configured to provide the respective encoded data signals.

9. The apparatus of claim 8, wherein the first and second encoders are each configured to encode the respective plurality of bits into a respective one of a plurality of voltage levels, wherein a logic level of each of the respective plurality of bits determines the respective one of the plurality of voltage levels.

10. The apparatus of claim 9, wherein each of the respective plurality of bits are two bits and wherein the plurality of voltage levels is four voltage levels.

11. The apparatus of claim 8, wherein the receiver comprises a plurality of fractional-rate receivers, and wherein each of the plurality of fractional-rate receivers are configured to receive the un-encoded differential data signals at a first data rate based on a first clock rate, and the respective data signals are provided at half the first data rate based on a second clock rate.

12. The apparatus of claim 11, wherein the first and second clock rates are different.

13. An apparatus, comprising:
   a receiver configured to receive un-encoded differential data signals, the receiver includes a plurality of fractional-rate receivers, wherein each of the plurality of fractional-rate receivers are configured to receive the un-encoded differential data signals at a first data rate based on a first clock rate, and the respective data signals are provided at half the first data rate based on a second clock rate, and wherein the second clock rate is less the first clock rate;
   first and second encoders configured to encode a respective plurality of bits into a respective encoded data signal; and
   first and second drivers coupled to the first and second encoders, respectively, and configured to provide the respective encoded data signals.

14. An apparatus, comprising:
   a receiver configured to receive un-encoded differential data signals;
   first and second encoders configured to encode a respective plurality of bits into a respective encoded data signal, wherein the encoded data signal is encoded based on four-level pulse amplitude modulation; and first and second drivers coupled to the first and second encoders, respectively, and configured to provide the respective encoded data signals.

15. A method, comprising:
receiving a differential data signal at a first data rate;
encoding a plurality of bits into an encoded data signal, wherein the encoded data signal corresponds to one of a plurality of voltage levels; and
transmitting an encoded data signal at a second data rate, wherein the second data rate is based on a number of bits in the plurality of bits encoded into the data signal,
wherein the differential data is received at the first data rate based on a first clock rate, and the encoded data signal is transmitted at the second data rate based on a second clock rate, and wherein the second clock rate is less than the first clock rate.

16. The method of claim 15, wherein the plurality of bits is two bits, and wherein the plurality of voltage levels is four voltage levels.

17. The method of claim 16, wherein logic levels of the two bits are encoded into a respective one of the four voltage levels.

18. The method of claim 15, wherein the second data rate is half the first data rate.

19. A method, comprising:
receiving differential data signals;
encoding a first plurality of bits into a first encoded data signal characterized by one of a plurality of voltage levels;
encoding a second plurality of bits into a second encoded data signal characterized by one of the plurality of voltage levels; and
transmitting the first and second encoded data signals,
wherein transmitting the first and second encoded data signals comprises transmitting each of the first and second encoded data signals responsive to a clock rate, wherein the clock rate is based at least in part on a number of bits encoded into each of the first and second encoded data signals.

20. The method of claim 19, wherein encoding a first plurality of bits into an encoded data signal characterized by one of a plurality of voltage levels comprises encoding two bits into an encoded data signal characterized by one of four voltage levels.

21. The method of claim 19, wherein the one of the plurality of voltage levels is indicative of a logic level of each bit of the first and second plurality of bits, respectively.

22. A method, comprising:
receiving differential data signals;
encoding a first plurality of bits into a first encoded data signal characterized by one of a plurality of voltage levels;
encoding a second plurality of bits into a second encoded data signal characterized by one of the plurality of voltage levels; and
transmitting the first and second encoded data signals, wherein the differential signals are received at a first data rate based on a first clock rate, and the first and second encoded data signals are transmitted at a second data rate based on a second clock rate, and wherein the first clock rate is greater than the second clock rate, and wherein the second data rate is half the first data rate.

23. An apparatus, comprising:
first and second channels;
a receiver coupled to the first and second channels and configured to receive differential data signals to receive first data at a first data rate; and
first and second transmitters coupled to the first and second channels, respectively, each transmitter configured to encode second data into a respective data signal and provide the respective data signal to output the second data at a second data rate,
wherein the first and second transmitters provide the respective data signals substantially simultaneously with each other.

24. The apparatus of claim 23, wherein the first data rate is twice the second data rate.

* * * * *